United States Patent Office.

AUSTIN S. MORSE AND EDWIN A. JEFFERIES, OF FORT WAYNE, INDIANA.

Letters Patent No. 104,336, dated June 14, 1870.

IMPROVED FIRE-KINDLER.

The Schedule referred to in these Letters Patent and making part of the same.

We, AUSTIN S. MORSE and EDWIN A. JEFFERIES, of Fort Wayne, in the county of Allen and State of Indiana, have invented a certain compound to be used in the manufacture of apparatus for kindling fires.

The nature of our said invention consists in so combining, in certain proportions, properly tempered with water, common potters' clay and clean common sand, that the mass, when combined, shall be homogeneous and of a plastic nature before drying, susceptible of being molded into any desirable form, but, when thoroughly dried, having, in an eminent degree, such properties of absorption as to render it capable of taking up any fluid substance which will not decompose it, in considerable quantities. Also, having properties which render it invulnerable to the action of a considerable degree of heat.

Our invention further consists in forming this plastic mass in any desirable form, and securing the same to any suitable holder or handle, and saturating the same with any of the combustible oils in use, and, after igniting the said oil, apply the flame produced thereby to any desirable purpose, especially to that of kindling fires.

The proportion of each of the ingredients contained in the above-mentioned compound is as follows, to wit:

Common pulverized clay, in a dry state, one pound; dry sand, two pounds. Mix well, and add water sufficient to render the mass plastic. Then mold in the desired form, and saturate with combustible oil, and the apparatus will, when ignited, emit a strong, fierce flame, which will continue until the oil is consumed.

What we claim as our invention, and desire to secure by Letters Patent, is—

The manufacture of the compound described, having said proportions, to be used for the purposes set forth.

AUSTIN S. MORSE.
EDWIN A. JEFFERIES.

Witnesses:
GEO. W. JONES,
H. F. WILLSON.